June 19, 1934.  W. E. SMITH  1,963,722
INDICATING CONTROL DEVICE
Filed Oct. 24, 1931   2 Sheets-Sheet 1
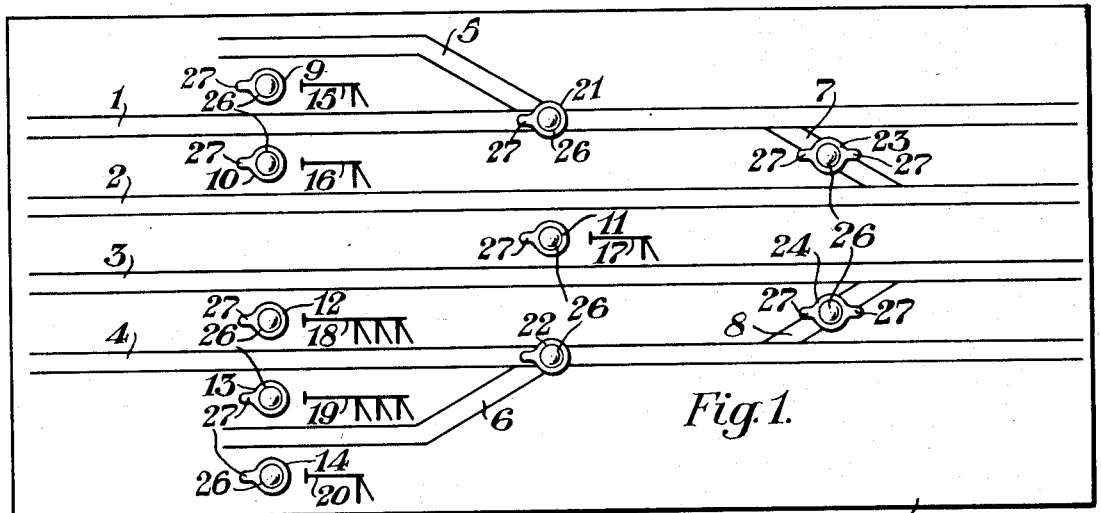
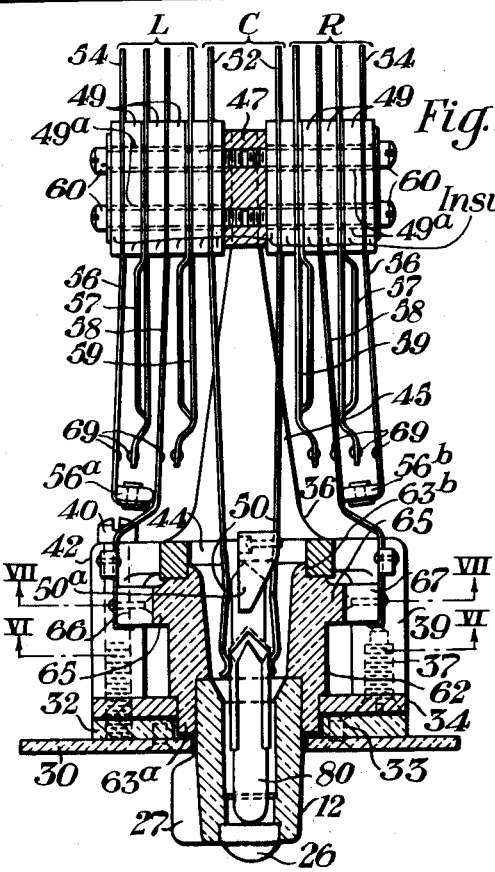
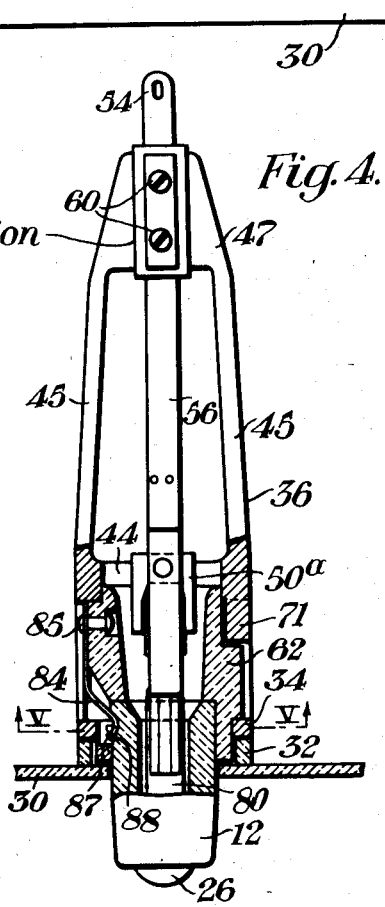
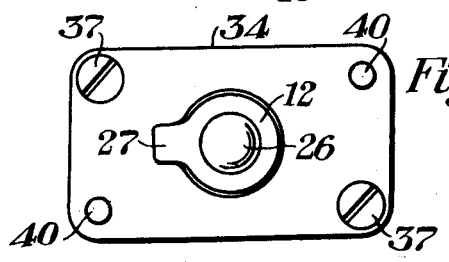
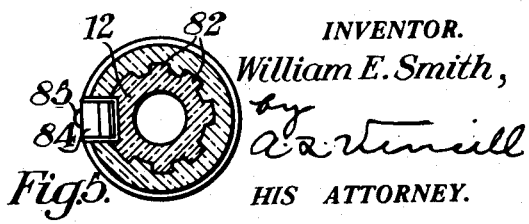
INVENTOR.
William E. Smith,
HIS ATTORNEY.

June 19, 1934.  W. E. SMITH  1,963,722
INDICATING CONTROL DEVICE
Filed Oct. 24, 1931   2 Sheets-Sheet 2

INVENTOR.
William E. Smith.
By
HIS ATTORNEY.

Patented June 19, 1934

1,963,722

UNITED STATES PATENT OFFICE 1,963,722

INDICATING CONTROL DEVICE

William E. Smith, Pittsburgh, Pa., assignor to The Union Switch & Signal Company, Swissvale, Pa., a corporation of Pennsylvania Application October 24, 1931, Serial No. 570,811

4 Claims. (Cl. 177—311)

My invention relates to indicating control devices, and particularly to combined circuit controllers and indication lights for facilitating the control, and improving the operation, of transportation systems, although not limited to this field.

I will describe five forms of indicating control devices embodying my invention, and will then point out the novel features thereof in claims.

Figure 6:
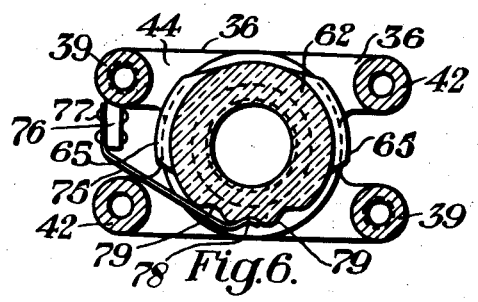
Figure 7:
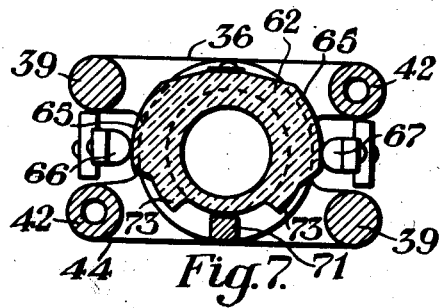

In the accompanying drawings, Fig. 1 is a front elevational view, showing a plurality of devices embodying my invention mounted on a control panel for a track layout, the track layout being represented diagrammatically on the panel in the usual manner. Fig. 2 is a top view, partially in elevation and partially in section, showing on an enlarged scale, one of the devices illustrated in Fig. 1, and embodying my invention. Fig. 3 is a front elevational view of the device shown in Fig. 2, with certain of the parts removed to better illustrate the construction thereof. Fig. 4 is a side view of the device, partially in elevation and partially in section, taken at right angles to Fig. 2. Fig. 5 is a view taken along the line V—V of Fig. 4. Figs. 6 and 7 are views taken along the lines VI—VI and VII, respectively, of Fig. 2. Figs. 8, 9, 10 and 11 are views similar to Fig. 7, showing modified forms of certain ones of the elements of the device at the section represented by Fig. 7.

Similar reference characters refer to similar parts in each of the several views.

Referring first to Fig. 1, I have here shown a control panel 30 having painted or otherwise formed thereon a diagram of a railway track layout representing through traffic tracks 1, 2, 3 and 4, side tracks 5 and 6, crossover tracks 7 and 8, and signals 15 to 20, inclusive.

Operating members 9 to 14, inclusive, in the form of rotatable switch handles are disposed on the panel in positions corresponding, respectively, to the position of the signals 15 to 20, inclusive, in the track layout. Similarly, operating members 21 to 24, inclusive, are disposed on the panel in positions corresponding, respectively, to the positions of track switches connecting the side tracks 5 and 6 and the crossover tracks 7 and 8 to the adjacent through tracks.

Bulls eyes or lamp caps 26, which are adapted to be at times illuminated by indication lamps suitably positioned within the operating members, in a manner to be described hereinafter, are disposed in the outer ends of the operating members, and the operating members are further provided with lugs 27 which project radially therefrom. The lugs 27 serve both as a means for indicating the condition of the device or devices controlled thereby, and as an aid in the turning of the operating members.

As an example of the relation of the lugs 27 to the track layout, the operating member 23 controls the track switches between the crossover track 7 and the through tracks 1 and 2. The operating member 23 has two of the lugs 27 in diametral alignment. When these lugs are parallel to the representation of the tracks 1 and 2, they indicate that the corresponding track switches are in normal condition for through traffic on the tracks 1 and 2. When the lugs lie along the representation of the crossover track 7, they indicate that the track switches are positioned to pass a train over the crossover track 7.

The operating members 21 and 22 in the positions illustrated, indicate, by the single lugs 27 thereof, that the corresponding track switches are in normal position for through traffic.

Similarly, the single lugs 27 on the other operating members indicate certain conditions of the corresponding signal devices.

The indication lamps which illuminate the lamp caps 26 may be used in various ways to indicate the completion or non-completion of one or more functions which are to be performed in response to the operation of the associated operating members. For example, an energized condition of the lamp may indicate the completion of one function, a deenergized condition the completion of another function, a flashing condition the completion of still another function, etc. As a more concrete example, in one system of indication commonly employed, when any of the operating members is operated, the associated lamp becomes deenergized until the operation of the switch or signal controlled by such operating member is completed. That is, when an operating member is turned to reverse a switch, the circuit which was previously closed for the associated lamp is opened, and a new circuit for the lamp is so conditioned that, when the movement of the switch is completed, the new circuit will become closed, and the lamp will again become energized. This action assures the operator that the switch has completed its movement.

When the operating member is turned in the reverse direction to restore the switch to its original position, the above mentioned new circuit is opened to again deenergize the lamp, and the initial circuit conditioned so that when the switch has completed its movement, the lamp is again energized.

The indication control devices of which the operating members shown in Fig. 1 form a part are all alike, except for certain minor structural differences in some of them, which are necessary to obtain the desired relationship pointed out hereinbefore between the condition of the switches or signals controlled by the devices and the positions of the lugs 27 on the operating members with relation to the diagrammatic representation of the track layout, and to provide the required contact combinations. It is believed, therefore, that a clear understanding of each of these devices may best be had by describing one of them, and then pointing out the differences between such one device, and certain ones of the remaining devices. Referring now particularly to Figs. 2 to 7, inclusive, in which the device for controlling the signal 18 is illustrated, as here shown, a plate 32, having an opening therethrough that is somewhat larger, but in registration with, an opening in the panel 30 through which the operating member 12 extends, is secured to the panel 30, as by rivets 33. The rivets 33 have flat heads flush with the front surface of the panel and the rear surface of the plate, in order to render the front surface of the panel smooth and to enable the plate to receive a bearing plate 34 in flat surface relation thereto. The bearing plate 34 has an accurately machined bearing-opening portion also in register with the openings in the panel 30 and the plate 32.

An elongated supporting frame or standard 36, preferably of cast brass, projects normal to the rear of the panel and is secured to the bearing plate 34 by means of two flat-head screws 37 located at diagonally-opposite corners of the plate, the heads of the screws being flush with the outer surface of the plate and the shanks of the screws extending into cylindrical bosses 39 formed on the frame 36, only one boss 39 and one screw 37 being visible in Fig. 2.

Elongated screws 40, at the other diagonal corners of the rectangular plate 34, extend through other cylindrical bosses 42 on the frame 36, through the bearing plate 34 and into the plate 32, but not through the panel 30. There are thus, four of the cylindrical bosses 39 and 42 disposed in spaced quadrature relation normal to the plane of the bearing plate 34 and integrally joined by a transverse element 44. A pair of arms 45, joined at the rear ends thereof by a portion 47, are integral with the transverse element 44. The portion 47 is in the form of a rectangular plate on which are mounted a plurality of elongated spring contact members disposed in groups marked C, L and R, and insulated from each other by dielectric plates 49 and bushings 49a.

The central group or pair of contact members marked C extend forwardly toward the panel 30 for the reception, between laterally-bent forward ends 50 thereof, of one of the indication lamps referred to hereinbefore. This lamp, which is designated by the reference character 80, is of the well-known type widely used in telephone switchboards. This lamp is maintained in the desired position between the ends 50 of the contact members by a suitable bifurcated insulating holding member 50a which is secured to one of the ends 50 of the contact members. Rearwardly-projecting portions 52 of the contact members C, constitute terminals for the reception of circuit conductors of the lamp circuit (not shown).

The left and right-hand groups of contact members, marked L and R, respectively, similarly have rearwardly-projecting, circuit-conductive-receiving portions 54 and forwardly-projecting portions 56, 57, 58 and 59.

Screws 60, and other elements not germane to this invention, secure the contact members, the dielectric plates 49 and the bushings 49a to the portion 47 of the frame 36.

A hollow substantially cylindrical dielectric member 62, surrounding the forward ends 50 of the lamp contact members C, has one bearing portion 63a, fitting the bearing opening in the bearing plate 34, and another bearing portion 63b fitting an accurately machined bearing opening in the transverse element 44. The member 62 is further provided with radially outwardly projecting cam portions 65 (see Fig. 7) against which, in the central position of the dielectric member 62, dogs 66 and 67 which are secured to the outer ends of the forwardly-projecting portions 58 of two of the contact members 54, bear laterally. When the dogs 66 and 67 are engaging the cam portions 65, the forwardly-projecting portions 58 of the movable contact members to which the dogs are attached are held in their outermost positions, in which positions they each engage a dog 56a or 56b secured to the outer end of the forwardly-projecting portion 56 of another of the contact members 54 of the associated contact group. Under these conditions, all of the contact buttons or beads 69 of the contact members are disengaged.

A dog 71, stationarily mounted on the transverse element 44 of the frame 36 (see Figs. 4 and 7), is disposed, when the hollow dielectric member 62 is at its mid-position, halfway between shoulders 73 in the dielectric member 62, and is adapted to cooperate with these shoulders to limit the turning movement of the dielectric member in both directions.

The cam portions 65 of the dielectric member 62 are so constructed that, when the member 62 is turned clockwise, as viewed in Fig. 7, until the right-hand shoulder 73 engages the stationary dog 71, the left-hand dog 66 rides off the raised portion of the cam 65 and the right-hand dog 67 retains its former position. This operation engages the contact buttons 69 of the contact group L, and retains the corresponding buttons of the group R in disengaged relation.

Conversely, when the member 62 is turned in the counter-clockwise direction from its central or neutral position, the contact buttons 69 of the group R are engaged and the corresponding buttons of the group L all remain in disengaged relation.

As shown most clearly in Fig. 6, an accentuating spring 75, secured to a lug 76 on one of the cylindrical bosses of the frame 36, as by rivets 77, has a curved end portion 78 which cooperates with notches 79 in the dielectric member 62 for biasing the latter in each of its operating and neutral positions.

The operating member 12 is of insulating material, generally of hollow tubular form, and is provided with an outer end opening in which the lamp cap 26 referred to hereinbefore is disposed. The operating member 12 is also provided with longitudinal radial splines or projections 82 that fit correspondingly shaped recesses in the dielectric member 62 (see Fig. 5).

As shown in Figs. 4 and 5, a spring 84 that is secured to the dielectric member 62, as by a rivet 85, has a curved end portion 87 adapted to fit a notch 88 in the operating member 12. This structure prevents accidental withdrawal of the operating member from its telescopic operative relation to the dielectric member 62, but permits withdrawal of the operating member by a longitudinal pull thereon. Since the lamp 80 extends a substantial distance into the operating member 12 from the front of the panel 30, removal of the operating member permits easy access to the lamp for renewal.

Figure 8:
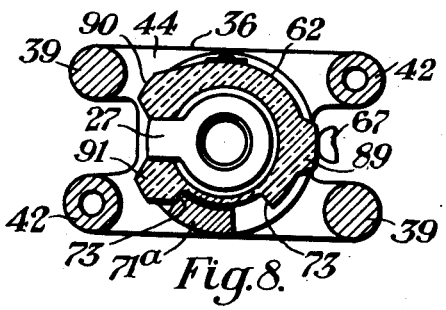

As pointed out hereinbefore, all of the devices of which the operating members shown in Fig. 1 form a part are similar to the device just described, except for certain minor differences in certain parts of some of them which are necessary to obtain the desired relationship between the condition of the switches or signals controlled by the devices and the positions of the lugs 27 on the operating members with relation to the diagram of the track layout, and to provide the desired circuit combinations. For example, the devices 9, 10, 11 and 14 are each similar to the device just described, with the exception of the differences illustrated in Fig. 8 which differences I will now describe. Referring to Fig. 8, as here shown, the stationary dog which cooperates with the shoulder 73 on the dielectric member 62, and which is here designated 71ᵃ, is somewhat wider than the dog 71 of the previously described device, and is so positioned with respect to the shoulder 73 on the dielectric member 62, that when the dielectric member is in the position corresponding to its mid-position in the device illustrated in Figs. 2 to 7, inclusive, this dog will engage the left-hand shoulder 73 and prevent counter-clockwise rotation of the members from this position. It will be seen, however, that the dielectric member 62 may be rotated from the position shown through a predetermined angle in a clockwise direction. Furthermore, as shown in Fig. 8, the dielectric member 62 is provided with three cam portions 89, 90 and 91 instead of the two cam portions 65 which are provided on the member shown in Figs. 6 and 7. The cam portion 89 cooperates with the previously described dog 67 on the forwardly-projecting portion 58 of the one contact member 54 of the contact group R in such manner that when the dielectric member 62 occupies the position in which its left-hand shoulder 73 engages the stationary dog 71ᵃ, the forwardly-projecting portions 58 and 56 of the movable contact members of the group R are both held in their outmost positions in which the cooperating contact buttons 69 are disengaged, but that, when the dielectric member is rotated to the position in which the right-hand shoulder 73 engages the stationary dog 71ᵃ, the dog 67 is out of engagement with the cam portion 89, and the cooperating contact buttons of the contact group R are then all engaged. Since only one set of contact members are needed to obtain the circuit combinations which are necessary to effect the desired control of the signals which are controlled by the devices of which the operating members 9, 10, 11 and 14 form a part, the other cam projections 90 and 91 are idle, these projections being formed on the dielectric members 62 in order to enable the same design of dielectric member to be used in other devices where additional contacts are needed, certain forms of which are shown in Figs. 10 and 11.

Figure 9:
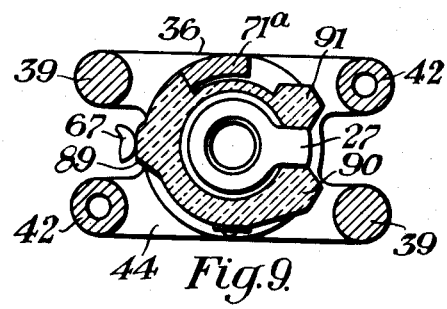

The device when modified as shown in Fig. 9, is intended to be used wherever it is desired to have the lug 27 on an operating member extending horizontally toward the right when the signal controlled by the device occupies one condition, and upwardly when the signal controlled by the device occupies another condition, as is the case under certain conditions when the track layout is just the reverse of that shown. The only difference between the device shown in Fig. 9 and that shown in Fig. 8 is that the device shown in Fig. 9 has been turned through an angle of 180°, and the position of the stationary dog has been changed somewhat to permit the desired movement of the operating member.

Figure 10:
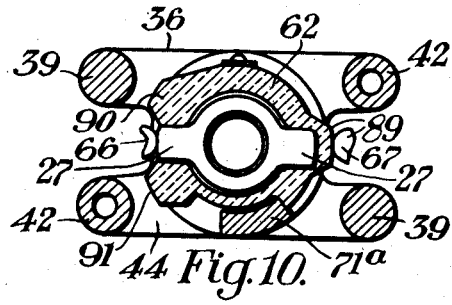
Figure 11:
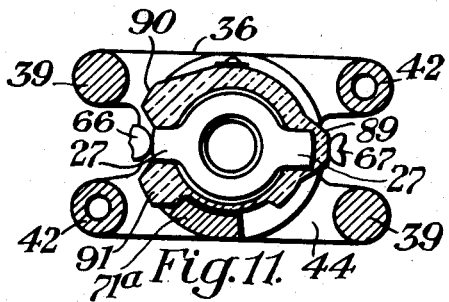

In Figs. 10 and 11, I have shown modifications in the device which are necessary when the device is to be used in the manner in which the device of which the operating members 23 and 24, shown in Fig. 1 form a part, are to be used. It is believed that these modifications will be apparent from an inspection of the drawings without describing them in detail, and that the operation of the device when modified as shown in Figs. 10 and 11 will be understood from the foregoing without further description.

Although I have herein shown and described only five forms of indicating control devices embodying my invention, it is understood that various changes and modifications may be made therein within the scope of the appended claims without departing from the spirit and scope of my invention.

Having thus described my invention, what I claim is:

1. An indicating control device comprising a frame including a transverse element provided with a bearing opening and with integral forwardly projecting bosses, a bearing plate secured to the forward ends of certain ones of said bosses and provided with a bearing opening which aligns with the bearing opening in said transverse element, a hollow substantially cylindrical dielectric member journalled in said two bearing openings and provided in its forward end with spaced longitudinally extending radial recesses, a tubular operating member of insulating material provided on its rear end with longitudinally extending radial splines adapted to fit the recesses in said dielectric member, means for yieldably retaining said operating member in place in said dielectric member, a forwardly projecting dog on said transverse element cooperating with spaced shoulders formed on said dielectric member to limit the amount of rotation of said dielectric member, means for yieldably retaining said dielectric member in a plurality of predetermined positions, two spaced fingers projecting rearwardly from said transverse element and joined at their rear ends by an integral plate, a plurality of spring contact members insulatingly secured to said integral plate and projecting toward the forward end of said frame, certain ones of said contact members being movable with respect to the other contact members, means including cams formed on said dielectric member for moving said movable contact members to different positions in response to movement of said dielectric member to different positions to selectively operate contacts formed by said contact members, other spring contact members insulatingly secured to said integral plate and projecting toward the forward end of said frame and provided within said dielectric member with means for supporting and making contact with an electric lamp, and a lamp cap secured within the outer end of said operating member.

2. In combination, a control panel provided with an opening extending therethrough, a support projecting from the rear of said panel, a hollow substantially cylindrical dielectric member mounted to rotate in said support about an axis which coincides with the axis of said opening, an operating member of insulating material extending through said opening and telescoping said dielectric member and provided around a portion of its circumference with radial splines which fit correspondingly shaped recesses provided in said dielectric member, whereby said dielectric member is constrained to rotate in response to rotation of said operating member, said operating member also being provided with an axial opening and with a notch, a spring secured to said dielectric member and provided with a curved end portion which cooperates with said notch in said operating member to normally retain said operating member in its proper operative telescopic relation with respect to said dielectric member but for permitting withdrawal of said operating member from its proper operative telescopic relation with respect to said dielectric member by a longitudinal pull on said operating member, a lamp cap disposed within the opening in said operating member, a lug on said operating member for facilitating the turning of said member and for indicating the position of said operating member, notches provided in said dielectric member, an accentuating spring secured to said frame and provided with a curved end which cooperates with said notches to maintain said dielectric member in predetermined positions when moved to such positions by said operating member, a dog secured to said frame, shoulders formed on said dielectric member and cooperating with said dog to limit the extreme positions to which said dielectric member can be moved by said operating member, a plurality of elongated contact members insulatingly mounted adjacent to the outer end of said support and projecting toward said panel, means integral with said dielectric member for operating certain ones of said contact members to different positions in response to rotation of said dielectric member to its different positions to selectively open and close contact formed by said contact members, and an electric lamp extending into the opening in said dielectric member for at times illuminating the lamp cap in said operating member.

3. In combination, a control panel having a through opening, a first plate secured to the rear face of said panel and provided with a through opening which is somewhat larger than the opening in said panel and which registers with the opening in said panel, a frame including a transverse element provided with a bearing opening and with integral forwardly projecting bosses, a bearing plate removably secured to the forward ends of certain ones of said bosses and provided with a bearing opening which aligns with the bearing opening in said transverse element, screws extending forwardly through the remaining bosses on said transverse element and through said bearing plate and screwed at their forward ends into said first plate for removably securing the unit formed by said frame and said bearing plate to said panel, the parts being so proportioned that said bearing openings axially align with the openings in said first plate and in said panel, two spaced arms extending rearwardly from the transverse element of said frame and joined at their rear ends by an integral plate, a plurality of elongated contact members insulatingly mounted on said integral plate and projecting toward said panel, said contact members having laterally movable portions between said panel and said integral plate, means for actuating said laterally movable portions including a member rotatably mounted in the bearing opening in said transverse element and in said bearing plate and provided with integral cams which cooperate with said laterally movable portions, a tubular operating member removably telescoping said turnable member from the front of said panel to turn the same, said tubular member having a wall opening, elongated spring contact members insulatingly mounted on said integral plate and extending toward the panel, and an electric lamp stationarily mounted between and supported by said spring contact members and projecting into said tubular operating member.

4. In combination, a control panel having a through opening, a first plate secured to the rear face of said panel and provided with a through opening which is somewhat larger than the opening in said panel and which registers with the opening in said panel, a frame including a transverse element provided with a bearing opening and with integral forwardly projecting bosses, a bearing plate removably secured to the forward ends of certain ones of said bosses and provided with a bearing opening which aligns with the bearing opening in said transverse element, screws extending forwardly through the remaining bosses on said transverse element and through said bearing plate and screwed at their forward ends into said first plate for removably securing the unit formed by said frame and said bearing plate to said panel, the parts being so proportioned that said bearing openings axially align with the openings in said first plate and in said panel, a hollow substantially cylindrical dielectric member journalled in said two bearing openings and provided in its forward end with spaced longitudinally extending radial recesses, a tubular operating member of insulating material extending through said panel and said first plate and provided on its rear end with longitudinally extending radial splines adapted to fit the recesses in said dielectric member, means for yieldably retaining said operating member in place in said dielectric member, a forwardly projecting dog on said transverse element cooperating with spaced shoulders formed on said dielectric member to limit the amount of rotation of said dielectric member, means for yieldably retaining said dielectric member in a plurality of predetermined positions, two spaced fingers projecting rearwardly from said transverse element and joined at their rear ends by an integral plate, a plurality of spring contact members insulatingly secured to said integral plate and projecting toward the forward end of said frame, certain ones of said contact members being movable with respect to the other contact members, means including cams formed on said dielectric member for moving said movable contact members to different positions in response to movement of said dielectric member to different positions to selectively operate contacts formed by said contact members, other spring contact members insulatingly secured to said integral plate and projecting toward the forward end of said frame and provided within said dielectric member with means for supporting and making contact with an electric lamp, and a lamp cap secured within the outer end of said operating member.

WILLIAM E. SMITH.